United States Patent
Chyou et al.

(10) Patent No.: US 8,297,273 B2
(45) Date of Patent: Oct. 30, 2012

(54) CONTROLLING APPARATUS FOR A CONCENTRATION PHOTOVOLTAIC SYSTEM

(75) Inventors: Shang-Lee Chyou, Taipei (TW); I-Tao Lung, Taoyuan County (TW); Shiu-Ju Yang, Taoyuan County (TW)

(73) Assignee: Atomic Energy Council—Institute of Nuclear Energy Research, Lungtan, Taoyuan (TW)

( * ) Notice: Subject to any disclaimer, the term of this patent is extended or adjusted under 35 U.S.C. 154(b) by 731 days.

(21) Appl. No.: 12/367,527

(22) Filed: Feb. 8, 2009

(65) Prior Publication Data
US 2010/0199971 A1    Aug. 12, 2010

(51) Int. Cl.
*H01L 31/042* (2006.01)
*G05D 3/00* (2006.01)

(52) U.S. Cl. ........ 126/569; 126/573; 126/574; 126/575; 136/246; 136/244; 250/203.4

(58) Field of Classification Search .......... 126/600–608, 126/623; 136/243–251; 250/203.4
See application file for complete search history.

(56) References Cited

U.S. PATENT DOCUMENTS

| | | | | |
|---|---|---|---|---|
| 5,227,618 A | * | 7/1993 | Shingleton | 250/203.4 |
| 5,228,924 A | * | 7/1993 | Barker et al. | 136/246 |
| 6,058,930 A | * | 5/2000 | Shingleton | 126/600 |
| 6,465,725 B1 | * | 10/2002 | Shibata et al. | 136/246 |
| 7,252,084 B2 | * | 8/2007 | Pawlenko et al. | 126/605 |
| 7,709,727 B2 | * | 5/2010 | Roehrig et al. | 136/243 |
| 2004/0216777 A1 | * | 11/2004 | Pan | 136/246 |
| 2009/0050192 A1 | * | 2/2009 | Tanaka et al. | 136/246 |
| 2010/0199971 A1 | * | 8/2010 | Chyou et al. | 126/578 |

FOREIGN PATENT DOCUMENTS
WO    WO2008119034 A1  * 10/2008
* cited by examiner

*Primary Examiner* — Steven B McAllister
*Assistant Examiner* — Nikhil Mashruwala
(74) *Attorney, Agent, or Firm* — Jackson IPG PLLC

(57) ABSTRACT

Disclosed is a controlling apparatus for use in a photovoltaic system. The photovoltaic system includes a solar cell array, an inverter and a solar tracker. The solar tracker includes a solar position sensor, a controller connected to the solar position sensor, a first motor connected to the controller for rotating the solar cell array according to the azimuth of the sun and a second motor connected to the controller for tilting the solar cell array according to the elevation of the sun. The controlling apparatus includes a central unit, a basic unit, a diagnosis unit, a maintenance unit, a security unit and a check unit.

3 Claims, 2 Drawing Sheets

CONTROLLING APPARATUS FOR A CONCENTRATION PHOTOVOLTAIC SYSTEM

FIELD OF THE INVENTION

The present invention relates to a photovoltaic system and, more particularly to a controlling apparatus for use in a photovoltaic system including a solar tracker and a solar cell array.

DESCRIPTION OF THE RELATED ARTS

The azimuth and elevation of the sun relative to a place on the earth change during a day. A conventional photovoltaic system includes a solar cell array. The solar cell array cannot be aligned to the sun based on the spin of the earth. Therefore, there is no way to take the advantage of the highest intensity of the sunlight at any given time of a day.

There have been devised solar trackers for photovoltaic systems to track the sun and align the photovoltaic system to the sun. Such a solar tracker includes a frame, a first motor, a second motor, a controller and a sensor. The frame supports a solar cell array. The first motor drives the frame and therefore changes the azimuth of the solar cell array. The second motor drives the frame and therefore changes the tilt of the solar cell array. The controller controls the first and second motors based on signals transmitted from the sensor. The sensor is located on the frame to detect the azimuth and elevation of the sun relative to a place on the earth where the photovoltaic system is located. The structures of such solar trackers are often complicated. The maintenance of such solar trackers is difficult and often requires technicians.

Moreover, current photovoltaic systems are limited to direct use, without monitoring the optimal respondent angle and direct normal angle in a certain place on the earth and the efficiency of the conversion of direct currents into alternating currents with inverters. The layouts of the current photovoltaic systems are not optimal, and the maintenance is difficult and requires a lot of resources and high costs.

The present invention is therefore intended to obviate or at least alleviate the problems encountered in prior art.

SUMMARY OF THE INVENTION

It is the primary objective of the present invention to provide a controlling apparatus for use in a photovoltaic system including a solar cell array, an inverter and a solar tracker including a solar position sensor, a controller connected to the solar position sensor, a first motor connected to the controller for rotating the solar cell array according to the azimuth of the sun and a second motor connected to the controller for tilting the solar cell array according to the elevation of the sun.

To achieve the foregoing objective the controlling apparatus includes a central unit, a basic unit, a diagnosis unit, a maintenance unit, a security unit and a check unit. T basic unit is operable in an alignment mode, a night mode and a restoration mode under the control of the central unit. The basic unit determines the direction of driving the solar tracker in the alignment mode, instructs the solar tracker to lay the solar cell array horizontally in the night mode, and executes a restoration mechanism after repair and maintenance of the solar tracker in the restoration mode. The diagnosis unit is connected to the central unit for scrutinizing the solar position sensor of the solar tracker, and scrutinizing the first and second motors and the inverter if determining the operation of the solar position sensor to be normal. The maintenance unit is operable in an initialization mode and a download mode under the control of the central unit. The maintenance unit acquires data of errors of the azimuth and elevation of the solar cell array after installment and re-installment of the solar tracker in the initialization mode, and downloads control programs from the controller of the solar tracker in the download mode. Under the control of the central unit, the security unit is operable in a storm mode when the wind speed reaches a certain value and a seismic mode in an earthquake. The security unit skips the solar position sensor and instructs the solar tracker to lay the solar cell array horizontally in the storm mode, and skips the solar position sensor and instructs the solar tracker to lay the solar cell array horizontally in the storm mode. The check unit is connected to the central unit for checking a clock built in the controller of the solar tracker, and synchronizing the clock of the controller of the solar tracker with a clock built therein if determining the time told with the clock of the controller of the solar tracker to be different from its own time.

Other objectives, advantages and features of the present invention will become apparent from the following description referring to the attached drawings.

BRIEF DESCRIPTIONS OF THE DRAWINGS

The present invention will be described via detailed illustration of the preferred embodiment referring to the drawings.

DESCRIPTION OF THE PREFERRED EMBODIMENT

Figure 1:
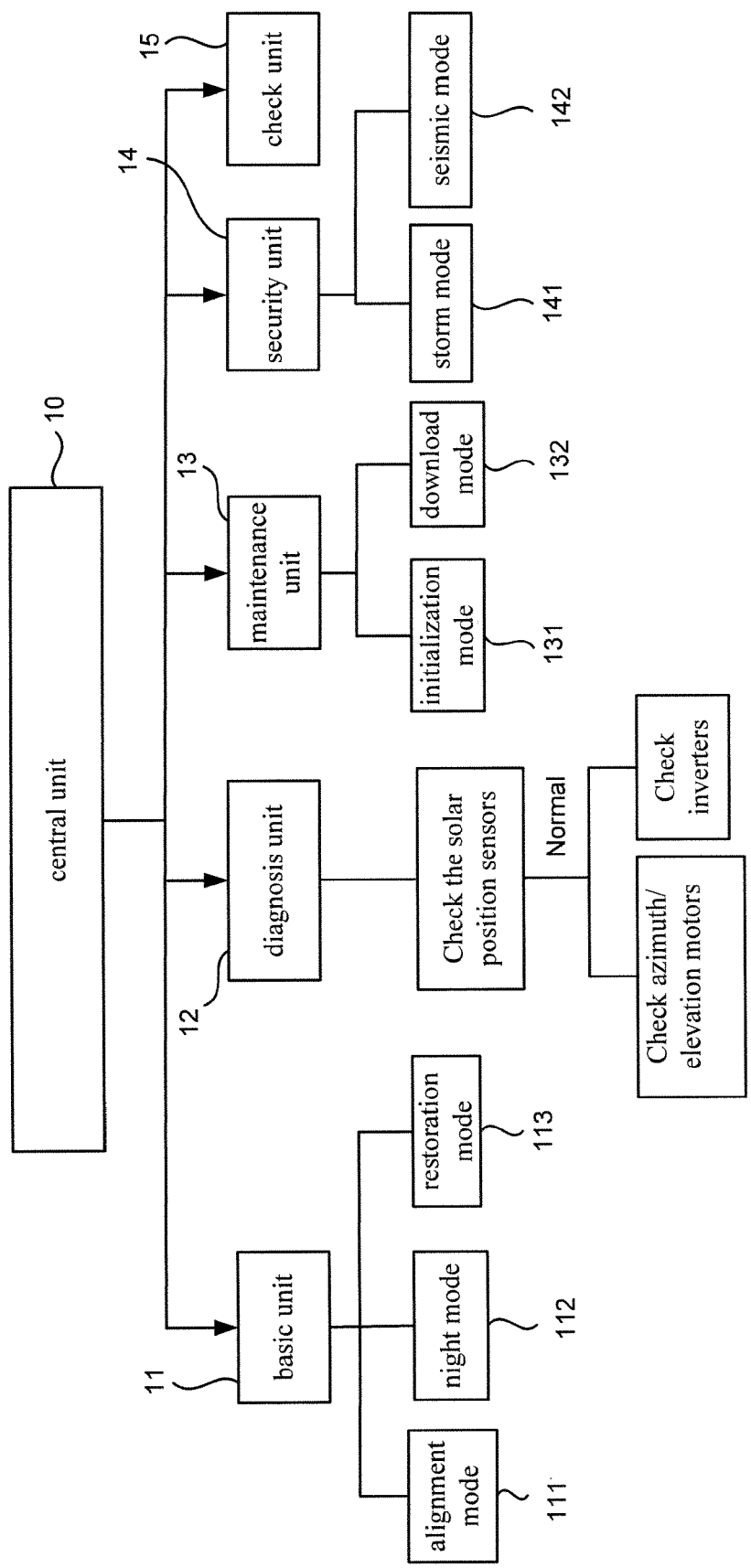
FIG. 1 is a block diagram of a central controlling apparatus for use in a photovoltaic system according to the preferred embodiment of the present invention.
Figure 2:
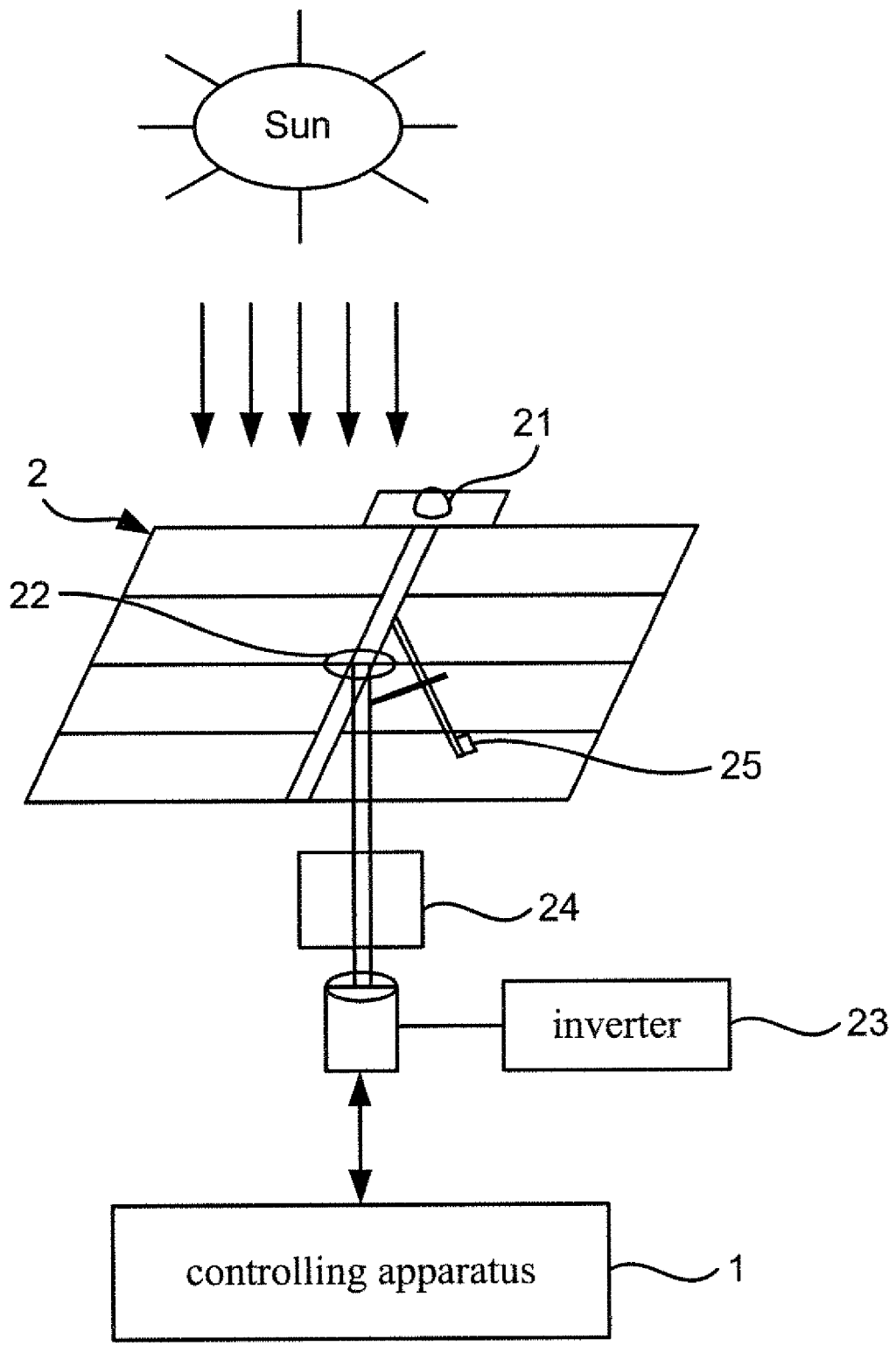
FIG. 2 is a scheme of a solar tracker for use with the central controlling apparatus shown in FIG. 1.

Referring to FIG. 2, a solar tracker 2 for use in a photovoltaic system includes a solar position sensor 21, a controller 24 connected to the solar position sensor 21, a first motor 22 connected to the controller 24 and a second motor 25 connected to the controller 24. The solar position sensor 21 senses the sunlight and sends signals to the controller 24. Based on the signals, the controller 24 determines the azimuth and elevation of the sun relative to a place on the earth where the photovoltaic system is located. Based on the azimuth of the sun, the controller 24 instructs the first motor 22 to rotate a solar cell array of the photovoltaic system. According to the elevation of the sun, the controller 24 instructs the second motor 25 to tilt the solar cell array. An inverter 23 is connected to the solar cell array. A controlling apparatus 1 according to the preferred embodiment of the present invention is connected to the solar tracker 2.

Referring to 1, the controlling apparatus 1 includes a central unit 10 for controlling a basic unit 11, a diagnosis unit 12, a maintenance unit 13, a security unit 14 and a check unit 15. The basic unit 11, the diagnosis unit 12, the maintenance unit 13, the maintenance unit 13, the security unit 14 and the check unit 15 are operable independent of one another.

Under the control of the central unit 10, the basic unit 11 is operable in an alignment mode 111, a night mode 112 and a restoration mode 113. In the alignment mode 111, the basic unit 11 determines the direction of driving the solar tracker 2. In the night mode 112, the night mode 112, the basic unit 11 instructs the solar tracker 2 to lay the solar cell array horizontally for protection in bad weather. The restoration mode 113 is initiated after repair and maintenance of the solar tracker 2.

The diagnosis unit 12 scrutinizes the solar position sensor 21 of the solar tracker 2. If the solar position sensor 21 is normal, the diagnosis unit 12 scrutinize the motors 22 and 25 and the inverter 23.

The maintenance unit 13 is operable in an initialization mode 131 and a download mode 132. In the initialization mode 131 the maintenance unit 13 acquires data of errors of the azimuth and elevation of the solar cell array after installment or re-installment of the solar tracker 2. In the download mode 132, the maintenance unit 13 down loads control programs from the controller 24 of the solar tracker 2.

The security unit 14 is operable in a storm mode 141 and a seismic mode 142. When the wind speed reaches a predetermined value, the security unit 14 enters the storm mode 141 to skip the solar position sensor 21 and instruct the solar tracker 2 to lay the solar cell array horizontally. In an earthquake, the security unit 14 enters the storm mode 141 to skip the solar position sensor 21 and instruct the solar tracker 2 to lay the solar cell array horizontally.

The check unit 15 checks a clock built in the controller 24 of the solar tracker 2. If determining the time told with the clock of the controller 24 of the solar tracker 2 to be different from its own time, the check unit 15 synchronizes the clock of the controller 24 of the solar tracker 2 with a clock built therein.

If direct normal irradiance ("DNI") on the photovoltaic system is lower than a predetermined threshold (the unit is $W/m^2$) for a predetermined period of time, the central unit 10 will acquire the azimuth and elevation of the solar tracker 2 compare the same with track data and start the alignment mode 111 of the basic unit 11 to send a STOP signal to the controller 24 of the solar tracker 2. On receiving the STOP signal, the controller 24 orders the solar tracker 2 to stop tracking the sun.

If the DNI on the photovoltaic system is higher than the threshold, i.e., the elevation of the sun is higher than a predetermined angle, the central unit 10 will start the alignment mode 111 of the basic unit 11 to send an ACT signal to the controller 24 of the solar tracker 2. On receiving the ACT signal, the controller 24 instructs the solar tracker 2 to start tracking the sun.

After sunset, the central unit 10 starts the alignment mode 111 of the basic unit 11 to send a RETURN signal to the controller 24 of the solar tracker 2. On receiving the RETURN signal, the controller 24 actuates the first motor 22 to return the solar cell array to the east. The tracking of the sun will begin again after sunrise tomorrow morning.

Moreover, the central unit 10 starts the night mode 112 of the basic unit 11 to send a LIE signal to the controller 24 of the solar tracker 2. On receiving the LIE signal, the controller 24 actuates the second motor 25 to lay the solar cell array horizontally.

After repair or maintenance of the solar tracker 2, the central unit 10 starts the maintenance mode 113 of the basic unit 11 to send a RESTORATION signal to the controller 24 of the solar tracker 2. On receiving the RESTORATION signal, the controller 24 actuates the second motors 22 and 25 to align the solar cell array to the sun.

When the DNI on the photovoltaic system is lower than the threshold, the central unit 10 starts the diagnosis unit 12 to scrutinize the solar position sensor 21, the motors 22 and 25 and the inverter 23.

The central unit 1 instructs the check unit 15 to send a global positioning system ("GPS") time signal to the controller 24 of the solar tracker 2. Thus, the central unit 10 of the controlling apparatus 1 controls a real-time clock built in the controller 24 of the solar tracker 2. The above-mentioned data are stored in the controlling apparatus 1 to be reviewed by an operator later.

The controlling apparatus 1 tackles the problems of the prior art discussed in the BACKGROUND OF INVENTION. The controlling apparatus 1 sends the RETURN signal and the ACT signal to the solar tracker 2 everyday. When the DNI is lower than the threshold, the controlling apparatus 1 sends the STOP signal to the solar tracker 2. The controlling apparatus 1 sends a GPS time signal to the solar tracker 2 to synchronize the time told with the solar tracker 2 with the GPS time. Moreover, the controlling apparatus 1 saves the data for later review.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A controlling apparatus and photovoltaic system comprising:
   a solar cell array,
   an inverter connected to the solar cell array,
   a solar tracker comprising:
      a solar position sensor configured to sense incident sunlight,
      a controller connected to the solar position sensor and receiving signals therefrom wherein the controller determines azimuth and elevation of the sun relative to a current location of the photovoltaic system,
      a first motor connected to the controller and operatively connected to the solar cell array for rotating the solar cell array according to the determined azimuth of the sun, and
      a second motor connected to the controller and operatively connected to the solar cell array for tilting the solar cell array according to the determined elevation of the sun, and
   a controlling apparatus comprising:
      a central unit;
      a basic unit operable, under the control of the central unit, wherein the basic unit determines a direction of driving the solar tracker in an alignment mode, instructs the solar tracker to lay the solar cell array horizontally in a night mode, and executes a restoration mechanism after repair and maintenance of the solar tracker in a restoration mode;
      a diagnosis unit operable under the control of the central unit so as to scrutinize the solar position sensor of the solar tracker, and so as to scrutinize the first and second motors and the inverter when operation of the solar position sensor is determined to be normal;
      a maintenance unit operable, under the control of the central unit, wherein the maintenance unit acquires data of errors of the azimuth and elevation of the solar cell array after installment and re-installment of the solar tracker in an initialization mode, and downloads control programs from the controller of the solar tracker in a download mode;
      a security unit operable, under the control of the central unit, in a storm mode when the wind speed reaches a predetermined value and in a seismic mode in an earthquake, wherein the security unit skips the solar position sensor and instructs the solar tracker to lay the solar cell array horizontally in the storm mode or in the seismic mode; and a check unit operable and connected to and under the control of the central unit for checking a clock built in the controller of the solar tracker, and synchronizing the clock of the controller of the solar tracker with a global positioning system (GPS) time signal when the time told with the clock of the controller of the solar tracker is determined to be different from the GPS time signal; wherein the basic unit, the diagnosis unit, the maintenance unit, the security unit and the check unit are each operable independently of each other;

wherein if a direct normal irradiance on the photovoltaic system is lower than a threshold for a period of time, the central unit will acquire the azimuth and elevation of the solar tracker, compare the same with track data, and start the alignment mode of the basic unit to send a STOP signal to the controller of the solar tracker to stop tracking the sun.

2. The controlling apparatus and photovoltaic system comprising: a solar cell array, an inverter connected to the solar cell array, a solar tracker comprising: a solar position sensor configured to sense incident sunlight, a controller connected to the solar position sensor and receiving signals therefrom wherein the controller determines azimuth and elevation of the sun relative to a current location of the photovoltaic system, a first motor connected to the controller and operatively connected to the solar cell array for rotating the solar cell array according to the determined azimuth of the sun, and a second motor connected to the controller and operatively connected to the solar cell array for tilting the solar cell array according to the determined elevation of the sun, and a the controlling apparatus further: comprising:

a central unit;

a basic unit operable, under the control of the central unit, wherein the basic unit determines a direction of driving the solar tracker in an alignment mode, instructs the solar tracker to lay the solar cell array horizontally in a night mode, and executes a restoration mechanism after repair and maintenance of the solar tracker in a restoration mode;

a diagnosis unit operable under the control of the central unit so as to scrutinize the solar position sensor of the solar tracker, and so as to scrutinize the first and second motors and the inverter when operation of the solar position sensor is determined to be normal;

a maintenance unit operable, under the control of the central unit, wherein the maintenance unit acquires data of errors of the azimuth and elevation of the solar cell array after installment and re-installment of the solar tracker in an initialization mode, and downloads control programs from the controller of the solar tracker in a download mode;

a security unit operable, under the control of the central unit, in a storm mode when the wind speed reaches a predetermined value and in a seismic mode in an earthquake, wherein the security unit skips the solar position sensor and instructs the solar tracker to lay the solar cell array horizontally in the storm mode or in the seismic mode; and a check unit operable and connected to and under the control of the central unit for checking a clock built in the controller of the solar tracker, and synchronizing the clock of the controller of the solar tracker with a global positioning system (GPS) time signal when the time told with the clock of the controller of the solar tracker is determined to be different from the GPS time signal;

wherein the basic unit, the diagnosis unit, the maintenance unit, the security unit and the check unit are each operable independently of each other; wherein if a direct normal irradiance on the photovoltaic system is larger than a threshold, the central unit will start the alignment mode of the basic unit to send an ACT signal to the controller of the solar tracker to start tracking the sun.

3. The controlling apparatus and photovoltaic system comprising: a solar cell array, an inverter connected to the solar cell array, a solar tracker comprising: a solar position sensor configured to sense incident sunlight, a controller connected to the solar position sensor and receiving signals therefrom wherein the controller determines azimuth and elevation of the sun relative to a current location of the photovoltaic system, a first motor connected to the controller and operatively connected to the solar cell array for rotating the solar cell array according to the determined azimuth of the sun, and a second motor connected to the controller and operatively connected to the solar cell array for tilting the solar cell array according to the determined elevation of the sun, and a the controlling apparatus further: comprising:

a central unit;

a basic unit operable, under the control of the central unit, wherein the basic unit determines a direction of driving the solar tracker in an alignment mode, instructs the solar tracker to lay the solar cell array horizontally in a night mode, and executes a restoration mechanism after repair and maintenance of the solar tracker in a restoration mode;

a diagnosis unit operable under the control of the central unit so as to scrutinize the solar position sensor of the solar tracker, and so as to scrutinize the first and second motors and the inverter when operation of the solar position sensor is determined to be normal;

a maintenance unit operable, under the control of the central unit, wherein the maintenance unit acquires data of errors of the azimuth and elevation of the solar cell array after installment and re-installment of the solar tracker in an initialization mode, and downloads control programs from the controller of the solar tracker in a download mode;

a security unit operable, under the control of the central unit, in a storm mode when the wind speed reaches a predetermined value and in a seismic mode in an earthquake, wherein the security unit skips the solar position sensor and instructs the solar tracker to lay the solar cell array horizontally in the storm mode or in the seismic mode; and a check unit operable and connected to and under the control of the central unit for checking a clock built in the controller of the solar tracker, and synchronizing the clock of the controller of the solar tracker with a global positioning system (GPS) time signal when the time told with the clock of the controller of the solar tracker is determined to be different from the GPS time signal;

wherein the basic unit, the diagnosis unit, the maintenance unit, the security unit and the check unit are each operable independently of each other; wherein if a direct normal irradiance on the photovoltaic system is lower than the threshold, the central unit will start the diagnosis unit to scrutinize the solar position sensor, the first and second motors and the inverter.

* * * * *